United States Patent [19]

Isaksson et al.

[11] Patent Number: 4,712,952
[45] Date of Patent: Dec. 15, 1987

[54] DRILL FOR GENERATING OF HOLES IN A WORK PIECE

[75] Inventors: Karl B. Isaksson; Bror G. K. Svahn, both of Sandviken, Sweden

[73] Assignee: Santrade Limited, Luzern, Switzerland

[21] Appl. No.: 835,944

[22] Filed: Mar. 4, 1986

[30] Foreign Application Priority Data

Mar. 7, 1985 [SE] Sweden ................................. 8501106

[51] Int. Cl.⁴ ............................................. B23B 51/00
[52] U.S. Cl. ..................................... 408/211; 175/421; 408/227
[58] Field of Search ................. 408/67, 204, 205, 206, 408/211, 212, 213, 223, 227, 228, 229, 703, 203.5; 175/397, 421

[56] References Cited

U.S. PATENT DOCUMENTS

| | | |
|---|---|---|
| 796,321 | 8/1905 | Granberg . |
| 1,352,825 | 9/1920 | Meredith et al. ................... 408/211 |
| 1,977,085 | 10/1934 | Pripps .................................. 175/421 |
| 2,357,835 | 9/1944 | Leissler ................................ 175/421 |
| 2,372,612 | 3/1945 | Stogsdill ............................... 175/421 |
| 4,352,610 | 10/1982 | Yankovoy et al. .................. 408/1 R |

FOREIGN PATENT DOCUMENTS

| | | | |
|---|---|---|---|
| 233151 | 2/1962 | Austria ................................ 408/211 |
| 1059378 | 6/1959 | Fed. Rep. of Germany ...... 408/211 |
| 158772 | 5/1957 | Switzerland ........................ 408/211 |
| 536001 | 4/1941 | United Kingdom . |

*Primary Examiner*—Z. R. Bilinsky
*Attorney, Agent, or Firm*—Burns, Doane, Swecker & Mathis

[57] ABSTRACT

The invention relates to a drill for generating of holes in a work piece, preferably in a composite material. The drill comprises a cylindrical shank portion, two cutting portions projecting in the axial and radial direction of the drill and two chip gullets. The cutting portions are arranged symmetrically about the center axis of the drill and each comprising a cutting tip, a minor cutting edge and a free-cutting edge. The cutting portions are shaped such that they require a small feed force in order to drill in the work piece.

7 Claims, 14 Drawing Figures

DRILL FOR GENERATING OF HOLES IN A WORK PIECE

BACKGROUND AND OBJECTS OF THE INVENTION

The present invention relates to a drill for generating a hole in a work piece, preferably a composite material comprising a shank having a substantially cylindrical envelope surface, and including a front longitudinal cutting end. The cutting end has two cutting portions arranged symmetrically about the center axis of the drill. The drill has a direction of rotation.

Known drills for drilling of composite material have a shape similar to drills for wood comprising a centering point and cutting edges arranged symmetrically therearound. The disadvantage with these drills is that they tear off the fibres being a part of the composite material, especially at the exit of the drill out of the material. The fibres are therefore forced outwardly at the exit such that the hole achieves a very fringy end and/or delamination in the surrounding fibre layer. Furthermore, the areas between the cutting tips and the centering point are filled up with cut material during drilling of stacks, i.e. drilling of sandwich materials, which disturbs the continuing drilling of the material. Furthermore, the center part of the drill cuts negatively, such that the matrix material, epoxi for example, melts and flows out of the hole wall and thereby impairs the strength of the hole area. The negative cutting incision of the center part of the drill furthermore results in that the drill requires a large feed force in order to penetrate the work material.

Another known drill is shown in U.S. Pat. No. 4,352,610. The drill is provided with brazed inserts having a large cutting angle such that the necessary power for the rotation of the drill is large. Furthermore, the drill is more complicated to produce relative to the drill according to the invention.

An object of the present invention is to provide a drill which may drill clean and fray-free holes.

Another object of the present invention is to provide a drill through which shape less power is needed for feed and rotation.

Still another object of the present invention is to provide a drill simple to manufacture.

Still another object is to provide a drill capable of drilling holes with small diameters.

THE DRAWINGS

These and other objects are achieved by a drill according to the present invention which will be more clearly described hereinafter with reference to the appended drawings.

DESCRIPTION OF PREFERRED EMBODIMENTS OF THE INVENTION

Figure 1:
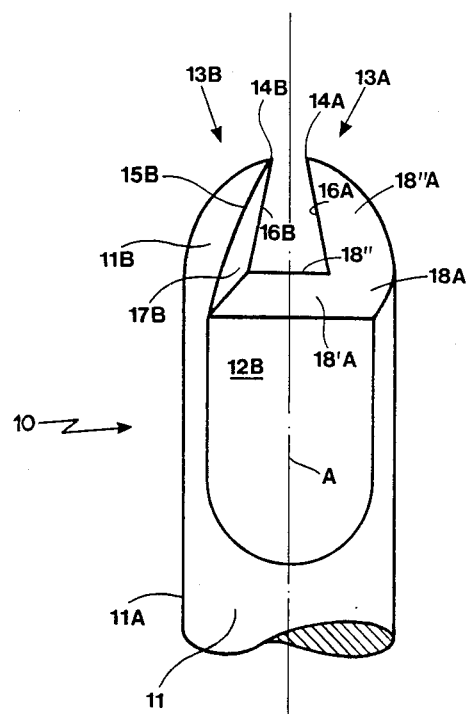
FIG. 1 shows a drill according to the invention is a side view.

In FIGS. 1–6 is shown a drill for generating a hole in a work piece, preferably in a composite having at least a first material and a second material which has a higher modulus of elasticity than the first material such as fibre reinforced forced plastics. The drilling occurs when the drill is rotated around its axis A in the rotational direction, illustrated by an arrow B in FIG. 3, and moved in the axial direction towards the work piece. The basic shape of the drill is a cylindrical rod, preferably of hard metal, out of which its geometry is ground in four grinding operations.

The drill 10 comprises a cylindrical oblong shank portion 11, two chip gullets 12A, 12B and two cutting portions 13A, 13B. The shank portion 11 is intended to be secured in a chuck of a drilling machine, not shown. The chip gullets 12A, 12B are mainly planar and form chords in the circular basic shape. The respective depth of the chip gullets 12A, 12B is constant beginning from a distance axially inwardly from the cutting end of the drill whereafter the gullets terminate and merge into the envelope surface 11A of the shank portion 11 in a direction towards the mounting end of the drill. The chip gullets may also have a depth successively diminishing towards the mounting end. Each cutting portion 13A,13B comprises a cutting end point 14A, 14B, an outer circumference cutting edge or a minor cutting edge 15A, 15B and an inner cutting edge or a free-cutting edge 16A, 16B. The cutting end points 14A, 14B are formed in a point of intersection between three surfaces namely the envelope surface 11A, the front surface or the chip surface 17A, 17B and the end surface 18A, 18B. The cutting points 14A, 14B define the longitudinal forwardmost point and the radially outermost point of the respective cutting portion as is evident from FIG. 2. The cutting end points are the parts of the drill which firstly reach contact with the work piece and which cut a ring in the surface of the work piece. The end surfaces 18A, 18B form an angle $\gamma$ with each other in the view according to FIG. 2. The angle $\gamma$ is 60 to 90 degrees. The chip gullets 12A, 12B are mainly parallel. Each free-cutting edge 16A, 16B forms a radial cutting angle $\beta$ between 13 and 25 degrees, preferably 13 and 20 degrees with the normal S to the center axis A in the view according to FIG. 3. The normal S intersects both of the cutting end points 14A, 14B. The front surfaces 17A, 17B face generally in the direction of rotation B, whereas the end surfaces face generally away from the direction of rotation B. The end surfaces 18A, 18B are mainly planar. The radially inner part surfaces 18'A, 18'B of the end surfaces converge in a direction axially forwardly and meet to form a ridge 18" in a normal N to the axis A of the drill. The part surfaces form an internal angle of 60° to 90°. The ridge 18" defines the forward axial extension of the radially inner portions 18'A, 18'B of the end surfaces. The distance from the point of intersection of the ridge 18" with the center axis A to the point of intersection of the ridge with the free-cutting edge 16A resp 16B is between 10 to 75% of the radius of the drill. The diameter D of the drill 10 is between 4 and 20 mm. Each of the inner cutting edges 16A, 16B extends non-radially as viewed in the longitudinal direction (FIG. 3) whereby a longitudinally rearward end 16A', 16B' of each inner cutting edge is disposed circumferentially rearwardly of the line S with reference to the direction of rotation B.

The radially outer portions 18"A, 18"B of the end surfaces are arranged symmetrically about the axis A. Each outer part surface extends from a normal N and tapers axially forwardly at the same time as they extend mainly in the circumference or rotational direction B of the drill. Each outer part surface terminates in a tip defined by the point of intersection between the free-cutting edge 16A resp 16B and the associated outer surface 11B, 11C. The outer surfaces 11B, 11C define longitudinally forward extensions of the envelope surface 11A and have a shape of an arc of a circle, preferably quarter-circular as seen in a top view according to FIG. 3.

The free-cutting edge 16A, 16B terminates respective outer part surface 18"A, 18"B radially inwardly. Thus, the edge 16A, 16B intersects the above-mentioned normal N radially outside the axis A of the drill. Each edge is arranged along a line of intersection between the end surface and the chip surface 17A resp 17B. The chip surface has a triangular shape whose three corners are arranged at the tip of the end surface, at the intersection between the edge and the normal N and at a point of intersection between an associated outer part surface 11B, 11C and the radially outer end of an opposed inner part surface 18'A, 18'B. The radially outer edge of the chip surface defines the cutting edge 15A, 15B which extends along a line of intersection between the chip surface and the associated outer surface. The internal angle between the radially outer part 18"A, 18"B of each end surface and associated chip surface is 90 degrees or less.

Figure 5:
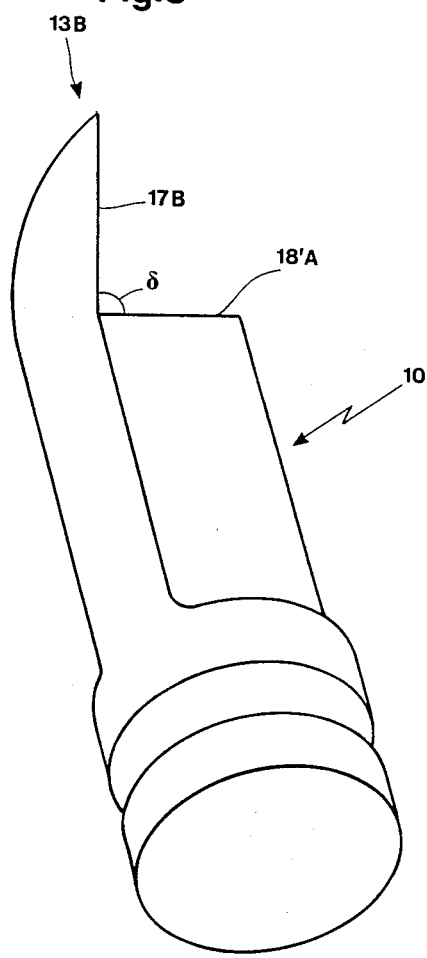
FIG. 5 shows the drill in an additional side view.

FIG. 5 shows the drill in a perspective view obliquely from below according to the arrow V in FIG. 2. The chip surface 17B is arranged with a negative rake angle δ relative to the part surface 18'A. The angle δ is between 70 to 90 degrees. The grinding of these two surfaces occurs in a single operation. The drill is indexed 180° thereafter and a corresponding grinding operation is executed thereby achieving the cutting portions of the drill.

Figure 3:
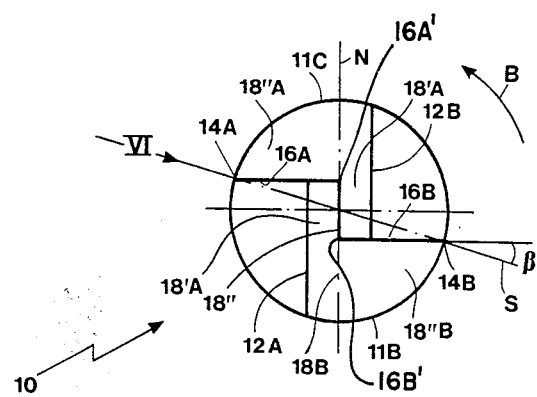
FIG. 3 shows the drill in a top view.
Figure 4:
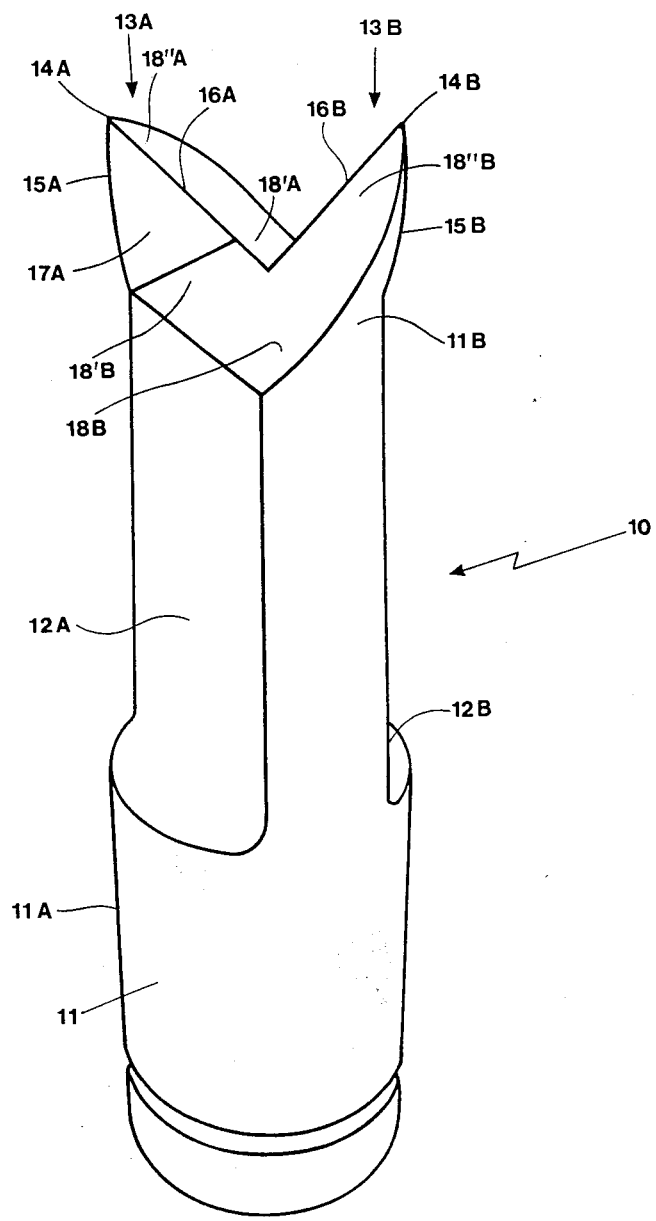
FIG. 4 shows the drill in a perspective view.
Figure 6:
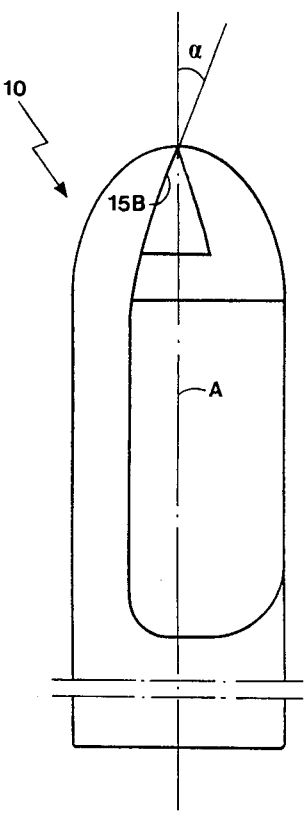
FIG. 6 shows the drill in an additional side view.

FIG. 6 shows a side view of the drill according to the arrow VI in FIG. 3. In this view in the plane of extension of the chip surfaces 17A, 17B the cutting edge forms an axial cutting angle α with the center axis A. The angle α is between 6 and 15 degrees, preferably between 10 and 15 degrees. The cutting edge 15A diametrically opposed to the edge 15B forms the same angle with the axis A.

Figures 7, 8:
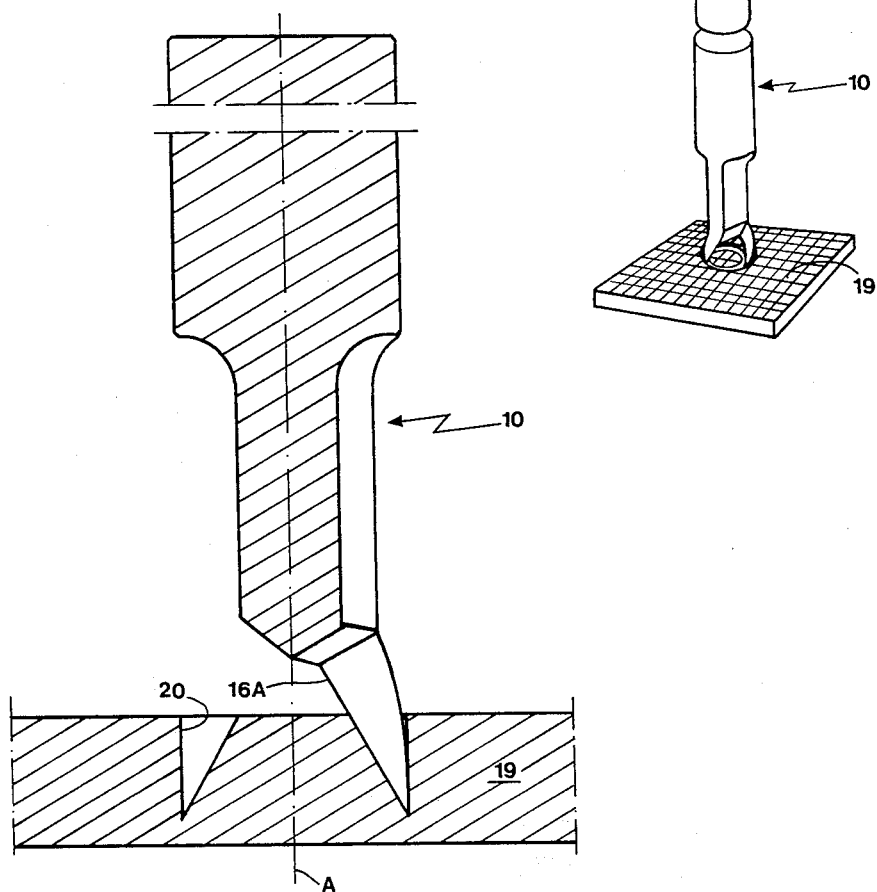
FIGS. 7 and 8 show the drill in a side view resp a perspective view in engagement with a work piece.

In FIGS. 7 and 8 is shown an almost completely penetrated work piece 19, preferably of composite material. The sharp tips of the drill, the free-cutting edges and the minor cutting edges cut a conical core out of the material. The drill is shaped such that the cone angle of the core becomes as small as possible thereby minimizing the necessary feed force. The free-cutting edge 16A is provided to cut away the material radially closest inside the cutting end point, which forms the wall of the hole 20.

Figure 9:
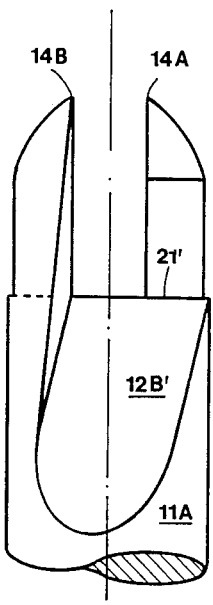
FIGS. 9 to 14 show alternative embodiments of drills according to the invention in side views and top views.
Figure 10:
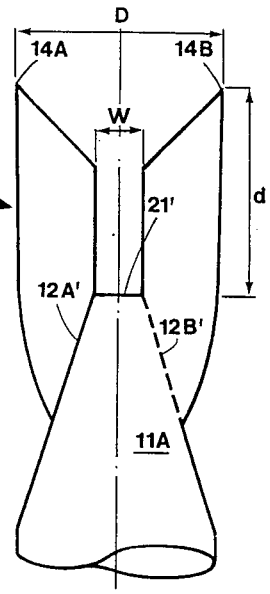
Figure 11:
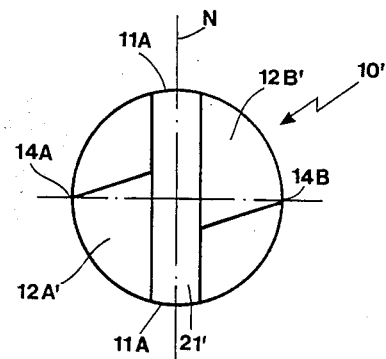

At drilling of thin laminates the chip gullets are dispersable such that the whole core is received by the space between the cutting portions 13A, 13B. FIGS. 9, 10 and 11 show an alternative embodiment of a drill 10' according to the invention. The figures correspond to the views of FIGS. 1, 2 and 3 respectively. The cutting portions of the drill 10' are identical with the ones shown above except for the cutting edges 15A, 15B being extended axially. The axial cutting angle α is the same. The drill 10' has been provided with a slot 21' extending in the transverse direction of the drill along the normal N. The slot terminates in the envelope surface 11A of the drill. The slot 21' is provided to receive cuttings and the core such that the drill may drill thick laminates. The width w of the slot is between 10 and 40% of the diameter D of the drill which is 4 to 20 mm. The depth of the slot counted from the plane of the cutting end points 14A, 14B is between 50 and 150% of the diameter D. The chip gullets 12A', 12B' are mainly planar and extend rearwardly and outwardly from the bottom of the slot. The gullets encloses an acute angle of 20 to 70 degrees. The depth of each chip gullet decreases successively towards the mounting end of the drill.

Figure 2:
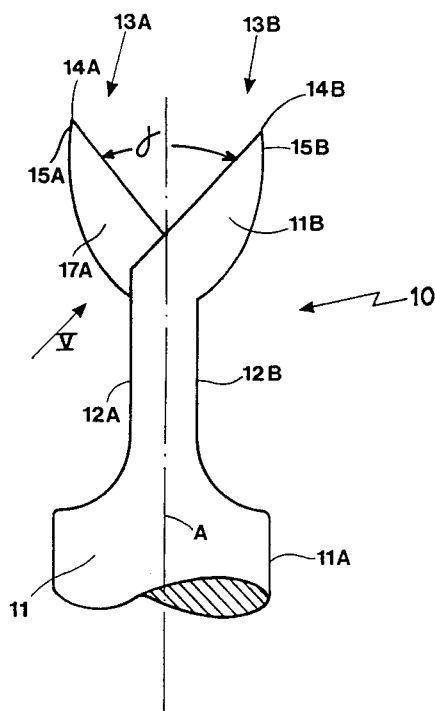
FIG. 2 shows the drill in an additional side view.
Figure 12:
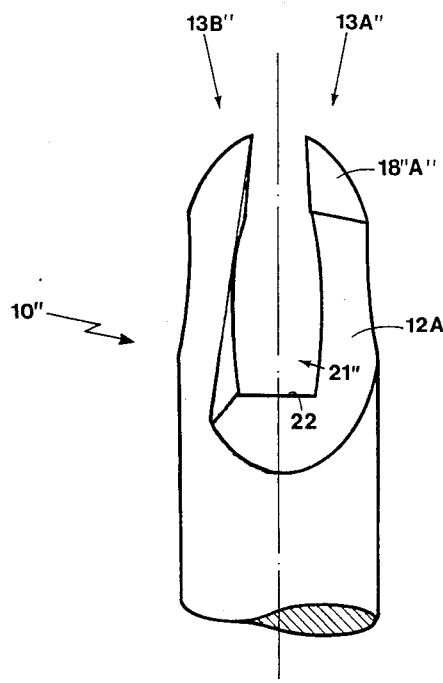
Figure 13:
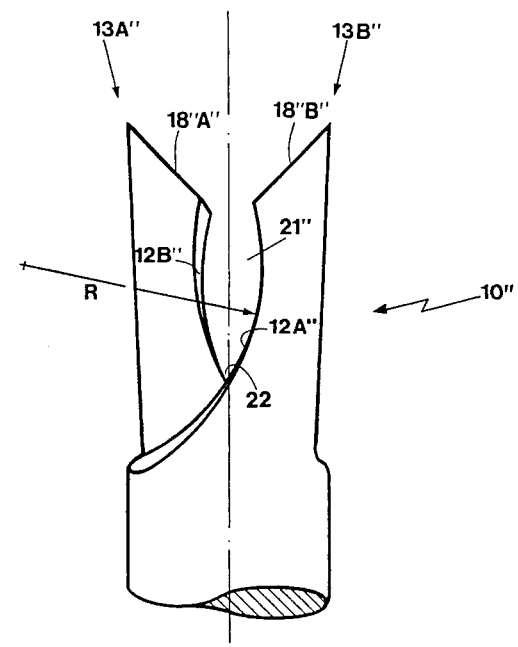
Figure 14:
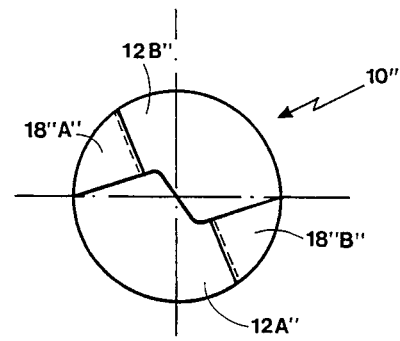

FIGS. 12, 13 and 14 show another alternative embodiment of a drill 10" according to the invention in views similar to the ones of FIGS. 1, 2 and 3 respectively. The cutting portions are identical with the cutting portions shown in FIGS. 9 to 11. The drill 10" is provided with a transverse slot 21". The rear end in the rotational direction of the drill of each cutting portion 13A", 13B" has been machined, preferably ground, to form the slot 21". The slot is formed by the chip gullets 12A", 12B". Each chip gullet is concave. The center of curvature of the chip gullet is situated axially rearwardly of the associated end surface. The radius R of the concave chip gullet is at least equal to the diameter of the drill, so that the depth of the gullet is larger at a section thereof axially inside the associated end surface 18"A", 18"B". This configuration provides for clearance for the main part of the chip gullet from the central core of the composite material being drilled. The radius of the chip gullet is equal to or larger than the diameter of the drill. The concave chip gullets meet in a sharp edge 22. Also this drill 10" is provided to drill thick laminates.

Thus, the present invention relates to a drill for drilling of composite materials through which shape the machined hole achieves a clean structure and therefore both the entrance and the exit part of the hole are given an appearance free from fringes and delamination. The drill requires a small feed force and is simple to manufacture.

We claim:

1. A drill for generating a hole in a workpiece comprised of a composite material, said drill comprising a shank rotatable about a longitudinal axis and including a cylindrical envelope surface and a longitudinally forward cutting end defined by a pair of cutting portions arranged symmetrically about said longitudinal axis, each said cutting portion comprising:
    a front surface defining a chip surface and facing in a first direction having a component extending in the direction of rotation, said front surface being raked in a positive fashion such that said first direction has another component extending longitudinally rearwardly,
    a curvalinear outer surface defining a longitudinally forward extension of said envelope surface, and
    an end surface facing in a direction having a component extending longitudinally forwardly and another component extending away from the direction of rotation,
    said front, outer, and end surfaces intersecting to form a cutting point which defines a longitudinally forwardmost point and a radially outermost point of the respective cutting portion, said front and outer surfaces intersecting at an acute angle to form an outer circumferential cutting edge extending longitudinally rearwardly from said cutting end point, said outer circumferential cutting edge forming a first acute angle with said axis as viewed in a radial direction, said front and end surfaces intersecting to form an inner cutting edge extending longitudinally rearwardly from said cutting end point and forming a second acute angle relative to an imaginary line which intersects both of said cutting end points as viewed in a longitudinal direction, a longitudinally innermost end of said inner cutting edge being spaced radially outwardly of said axis and radially inwardly of said outer surface, each of said inner cutting edges extending nonradially as viewed in said longitudinal direction, with a longitudinally rearward end of each of said inner cutting edges disposed circumferentially rearwardly of said imaginary line with reference to said direction of rotation as viewed in said longitudinal direction.

2. Drill according to claim 1, wherein said first angle is between 6 to 15 degrees, and said second angle is between 13 and 25 degrees.

3. Drill according to claim 1, wherein said end surfaces are each planar and converge in a longitudinally rearward direction from said cutting end points such that radially inner portions of said end surfaces intersect along a line which is normal relative to said axis.

4. Drill according to claim 3, wherein each of said end surfaces includes a radially outer portion which narrows in a direction toward said cutting point, said radially outer portion intersecting an associated one of said front surfaces to form therewith an angle less than 90 degrees.

5. Drill according to claim 4, wherein said front surfaces contain three sides defined respectively by said outer cutting edge, said inner cutting edge, and a line of intersection between said front surface and said inner portion of one of said planar end surfaces.

6. Drill according to claim 5, wherein said shank includes two chip gullets, the longitudinally forward ends of which intersect respective ones of said planar end surfaces.

7. Drill according to claim 3, wherein said converging end surfaces form a third acute angle lying in the interval of 60 to 90 degrees.

* * * * *